US007606425B2

(12) United States Patent
Bazakos et al.

(10) Patent No.: US 7,606,425 B2
(45) Date of Patent: Oct. 20, 2009

(54) UNSUPERVISED LEARNING OF EVENTS IN A VIDEO SEQUENCE

(75) Inventors: Michael E. Bazakos, Bloomington, MN (US); Yunqian Ma, Roseville, MN (US); Vassilios Morellas, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 536 days.

(21) Appl. No.: 10/938,244

(22) Filed: Sep. 9, 2004

(65) Prior Publication Data
US 2006/0053342 A1 Mar. 9, 2006

(51) Int. Cl.
*G06K 9/00* (2006.01)
(52) U.S. Cl. .................. 382/224; 382/103; 382/225; 714/26; 702/181; 348/143; 348/154
(58) Field of Classification Search .................. 382/103, 382/141, 224, 225; 435/7.24; 379/265.02; 700/94; 348/150, 161, E7.085, 143, 155, 348/144, 148, 149, 154, 169, 170, 171, 172, 348/586, 700, 699; 714/26, 25; 707/104.1, 707/E17.009, 3, 255, 256; 709/224, 223; 436/536, 805, 800, 172; 715/256; 704/E15.026, 704/E15.045; 324/402, 379; 395/200.11, 395/800, 200.08, 850, 200.01; 702/179, 702/180, 181, 182, 187–188, 194, 196; 717/125, 717/127, 132, 134, 155
See application file for complete search history.

(56) References Cited
U.S. PATENT DOCUMENTS
5,596,994 A * 1/1997 Bro ............................ 600/545

5,634,008 A * 5/1997 Gaffaney et al. ............ 709/224
5,828,809 A 10/1998 Chang et al.

(Continued)

FOREIGN PATENT DOCUMENTS
JP    2000276577 A  * 10/2000
WO    0163576       8/2001

OTHER PUBLICATIONS www.objectvideo.com, Lipton, "Object Video Forensics: Activity-Based Video Indexing and Retrieval for Physical Security Applications," 18 pages, printed Sep. 2004.

(Continued)

*Primary Examiner*—Sheela C Chawan
(74) *Attorney, Agent, or Firm*—Honeywell International Inc.; Kris Fredrick

(57) ABSTRACT

Methods and systems for the unsupervised learning of events contained within a video sequence, including apparatus and interfaces for implementing such systems and methods, are disclosed. An illustrative method in accordance with an exemplary embodiment of the present invention may include the steps of providing a behavioral analysis engine, initiating a training phase mode within the behavioral analysis engine and obtaining a feature vector including one or more parameters relating to an object located within an image sequence, and then analyzing the feature vector to determine a number of possible event candidates. The behavioral analysis engine can be configured to prompt the user to confirm whether an event candidate is a new event, an existing event, or an outlier. Once trained, a testing/operational phase mode of the behavioral analysis engine can be further implemented to detect the occurrence of one or more learned events, if desired.

40 Claims, 12 Drawing Sheets

U.S. PATENT DOCUMENTS

| | | |
|---|---|---|
| 5,969,755 A | 10/1999 | Courtney |
| 5,974,235 A | 10/1999 | Nunally et al. |
| 6,359,647 B1 * | 3/2002 | Sengupta et al. ............ 348/154 |
| 6,424,370 B1 | 7/2002 | Courtney |
| 6,570,608 B1 * | 5/2003 | Tserng ...................... 348/143 |
| 6,628,835 B1 | 9/2003 | Brill et al. |
| 6,721,454 B1 | 4/2004 | Qian et al. |
| 6,845,357 B2 * | 1/2005 | Shetty et al. ................ 704/255 |
| 6,879,709 B2 * | 4/2005 | Tian et al. ................... 382/118 |
| 7,076,102 B2 * | 7/2006 | Lin et al. .................... 382/218 |
| 7,106,885 B2 * | 9/2006 | Osterweil et al. ........... 382/103 |
| 2003/0051026 A1 * | 3/2003 | Carter et al. ............... 709/224 |
| 2003/0058340 A1 | 3/2003 | Lin et al. |
| 2003/0123703 A1 | 7/2003 | Pavlidis et al. |
| 2004/0080615 A1 * | 4/2004 | Klein et al. ................. 348/143 |

OTHER PUBLICATIONS www.objectvideo.com, LIpton et al., "Critical Asset Protection, Perimeter Monitoring, and Threat Detection Using Automated Video Surveillance," pp. 1-11, printed Sep. 2004.

Medioni et al., "Event Detection and Analysis from Video Streams," IEEE Transactions on Pattern Analysis and Machine Intelligence, vol. 23, No. 8, pp. 873-889, Aug. 2001.

Porikli et al., "Event Detection by Eigenvector Decomposition Using Object and Frame Features," IEEE, 10 pages, Apr. 2004.

* cited by examiner

UNSUPERVISED LEARNING OF EVENTS IN A VIDEO SEQUENCE

FIELD

The present invention relates generally to the field of automated video surveillance systems. More specifically, the present invention pertains to methods and systems for unsupervised learning of events in video sequences obtained from one or more image sensors.

BACKGROUND

Video surveillance systems are used in a variety of applications to detect and monitor objects within an environment. In security applications, for example, such systems are sometimes employed to detect and track individuals or vehicles entering or leaving a building facility or security gate, or to monitor individuals within a store, office building, hospital, or other such setting where the health and/or safety of the occupants may be of concern. In the aviation industry, for example, such systems have been used to detect the presence of individuals at key locations within an airport such as at a security gate or parking garage.

Many traditional surveillance systems are monitored using closed-circuit television (CCTV) cameras, which require the use of human interaction to observe, analyze, and recognize particular activities and/or events. In certain security applications, for example, a number of CCTV monitors can be configured to receive real-time video images from one or more video cameras within the system, which can then be viewed by security personnel to detect the occurrence of a security breach or other such event. While such surveillance systems are commonplace, they are typically prone to human error and are ineffectual in those applications where the detection of events by the naked eye is difficult or unfeasible.

More sophisticated surveillance systems in the art typically rely on the use of computer vision algorithms (e.g. special software programs) to monitor activity detected by the various cameras, sensors, and other components within the system. Such software programs usually include an event library of pre-programmed algorithms or routines that, when implemented, can be used to detect the occurrence of events within a space. In certain systems, the software program can also permit the monitoring of activity at other various ranges of the electromagnetic spectrum outside of the visible spectrum.

In certain applications, it may be desirable to provide additional algorithmic functionality to the software program to permit the detection and monitoring of new events not contained in the existing event library. To accomplish this task, many existing systems require the user to custom code the new event manually into the software program using a programming language such as C++, Visual Basic, or Java. Such technique typically requires the user to have an extensive knowledge of computer programming and software coding as well as an understanding of the various surveillance components (e.g. cameras, sensors, etc.) within the surveillance system. In some cases, the programming of new events may require the user to re-code the entire software program, increasing the time and expense necessary to upgrade the system. Because such software programs lack an automated means to define and add new events within the system, many surveillance systems are often limited to detecting those events already programmed within their event library.

SUMMARY

The present invention pertains to methods and systems for the unsupervised learning of events in a video sequence. An illustrative behavioral analysis engine and graphical user interface for use with such methods and systems are also disclosed herein.

An illustrative method of unsupervised learning of events contained within a video sequence may include the steps of providing a behavioral analysis engine adapted to learn new events contained within an image sequence, and then initiating a training phase mode within the behavioral analysis engine that analyzes feature vectors relating to one or more objects disposed within the image sequence to determine a number of possible event candidates. In certain embodiments, for example, the behavioral analysis engine may include an unsupervised learning algorithm configured to automatically group clusters of points together within a feature space using a clustering routine. In some embodiments, the groups of cluster points representing each feature vector can be displayed graphically on a graphical user interface, allowing a user to visually confirm possible event candidates by selecting the appropriate cluster of points on a display screen.

The behavioral analysis engine may further include a testing/operational phase mode that can be used to detect the occurrence of one or more programmed events in real-time or from a previously recorded video clip. During the testing/operational phase mode, the behavioral analysis engine can be configured to compare features contained within a feature vector at a specific time against one or more events contained within an event library to determine whether an event has occurred. If an event is detected, the behavioral analysis engine can be configured to determine the probability that the event detected is accurate. If the probability that an event has occurred is greater than a pre-determined confidence threshold value, the behavioral analysis engine can output an alarm or other such response informing the user that an event has occurred.

The behavioral analysis engine may be included as part of a video surveillance system including one or more image sensors each adapted to produce an image sequence within a field of view. In certain embodiments, for example, the behavioral analysis engine may be provided as part of a network of video cameras each adapted to determine the occurrence of different events within an environment. The behavioral analysis engine may include an actor feature database, a frame feature database, and/or an event library to store various feature and event parameters detected by the surveillance system. In some embodiments, the behavioral analysis engine may be provided as a software engine adapted to run on an individual computer or over a computer network.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of various programming and operational steps are illustrated in the various views, those skilled in the art will recognize that many of the examples provided have suitable alternatives that can be utilized.

Figure 1:
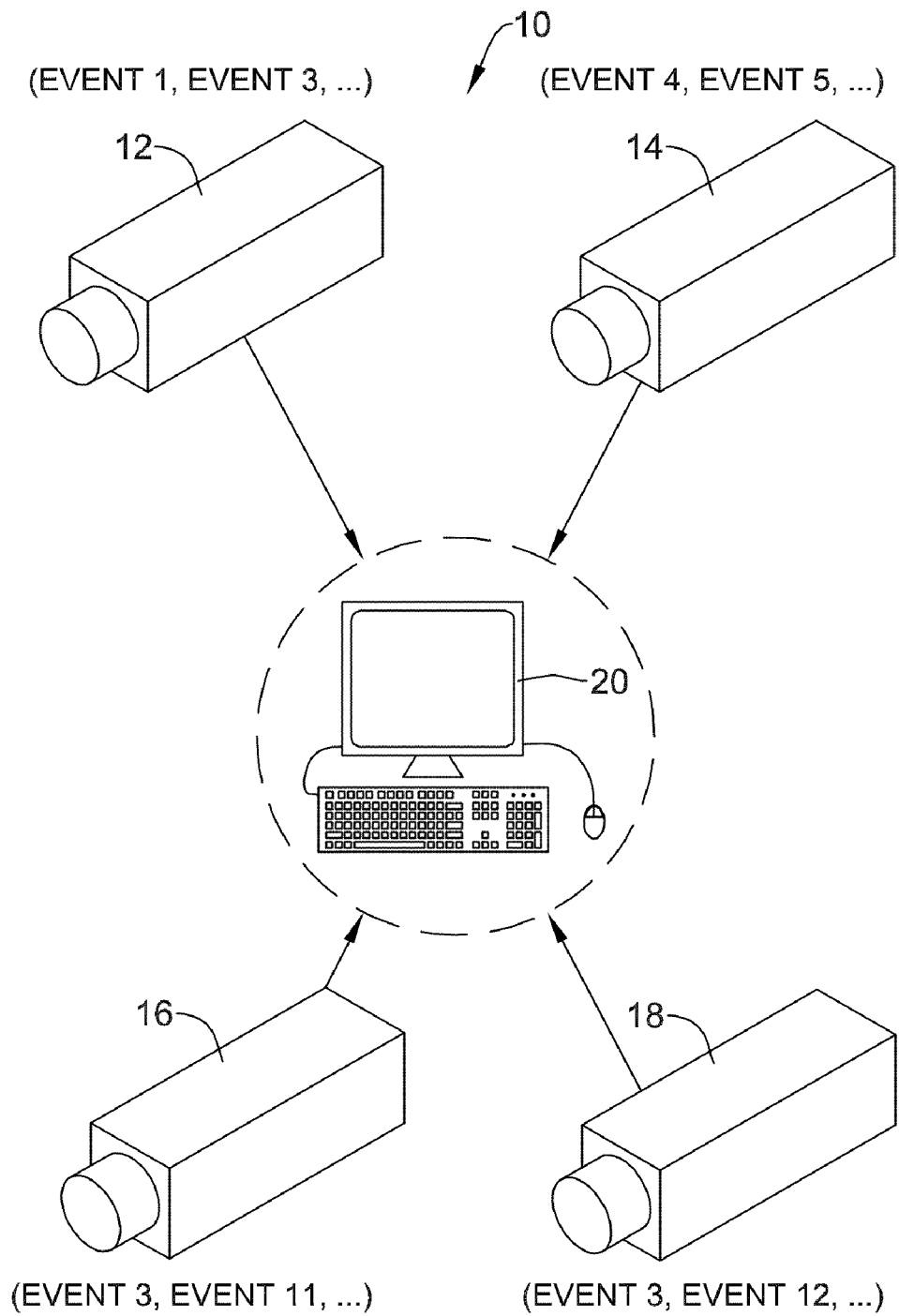
FIG. 1 is a high-level diagram showing a multi-sensor video surveillance system in accordance with an illustrative embodiment of the present invention.

FIG. 1 is a high-level diagram showing a multi-sensor video surveillance system 10 in accordance with an illustrative embodiment of the present invention employing multiple image sensors 12,14,16,18. As shown in FIG. 1, each image sensor 12,14,16,18 can be networked together via a computer 20, which can include software and/or hardware adapted to process real-time images received from one or more of the image sensors 12,14,16,18 to detect the occurrence of a particular event within the environment. In certain embodiments, for example, each of the image sensors 12,14,16,18 can be positioned at various locations of a building or structure and tasked to acquire images that can be used to monitor individuals and/or other objects located within a room, hallway, elevator, parking garage, or other such space. The computer 20 can be configured to run various low-level and high-level processing algorithms or routines that can be used to detect the occurrence of events using behavior classification, object classification, intent analysis, or other such technique. Such algorithms or routines can be programmed within an event library or database, which can be dynamically updated by the user to task the surveillance system 10 in a particular manner.

In certain embodiments, the computer 20 can be configured to task the image sensors 12,14,16,18 to detect and monitor different events programmed within the event library. In the illustrative surveillance system 10 of FIG. 1, for example, the computer 20 can be configured to task the first image sensor 12 to detect the occurrence of a first set of events (e.g. event 1, event 3, etc.), the second image sensor 14 to detect the occurrence of a second set of events (e.g. event 4, event 5, etc.), the third image sensor 16 to detect the occurrence of a third set of events (e.g. event 3, event 11, etc.), and so forth. If, for example, the surveillance system 10 is a security system for use in monitoring an office building, the first image sensor 12 can be tasked to track individuals moving within a hallway whereas the second image sensor 14 can be tasked to detect motion within a perimeter of the building.

The number of image sensors employed by the surveillance system 10 may vary depending on the particular application. Thus, while the illustrative embodiment of FIG. 1 depicts a surveillance system 10 employing four image sensors 12,14, 16,18, it should be understood that a greater or lesser number of image sensors can be used. In addition, the type of image sensor employed may also vary depending on the particular application or the intended use of the device. In certain applications, for example, the image sensor may include a visible-light camera, an infrared camera, or other such device adapted to acquire images in a particular spectrum range. The type of image sensor employed (e.g. static camera, Pan Tilt Zoon (PTZ) camera, etc.) may also vary depending on the installation location and/or the type of objects to be tracked. While the term "video" is used herein with respect to specific devices and/or examples, such term should be interpreted broadly to include any images generated by an image sensor. Examples of other image spectrums contemplated may include, but are not limited to, near infrared (NIR), Midwave Infrared (MIR), Longwave Infrared (LIR), Laser Imaging Radar (LIDAR), and/or passive or active Milli-Meter Wave (MMV).

In certain embodiments, the computer 20 can be programmed to detect and monitor the behavior of actors (e.g. individuals) located within one or more of the image sensor's field of view (FOV). If, for example, the surveillance system 10 is configured for use in a hospital, clinic, eldercare facility or other such environment, the computer 20 can be programmed to run one or more algorithms or routines that analyze the behavior of individuals to detect, for example, whether a fall has occurred, or to detect whether an individual has stopped moving or is disoriented. The surveillance system 10 can also be used in other applications such as that described in co-pending Application Ser. No. 10/341,335, entitled "A Method for Monitoring, Recognizing, Supporting, and Responding to the Behavior of an Actor", which is incorporated herein by reference in its entirety.

The computer 20 can be further configured to run an algorithm or routine to extract various information from the FOV of one or more of the image sensors 12,14,16,18. If, for example, the computer 20 is programmed to task the first image sensor 12 to detect object motion within its FOV, the computer 20 can be configured to initiate a low-level processing algorithm or routine (e.g. an image subtraction algorithm) that compares individual frames within an image sequence to detect if motion is present.

Figure 2:
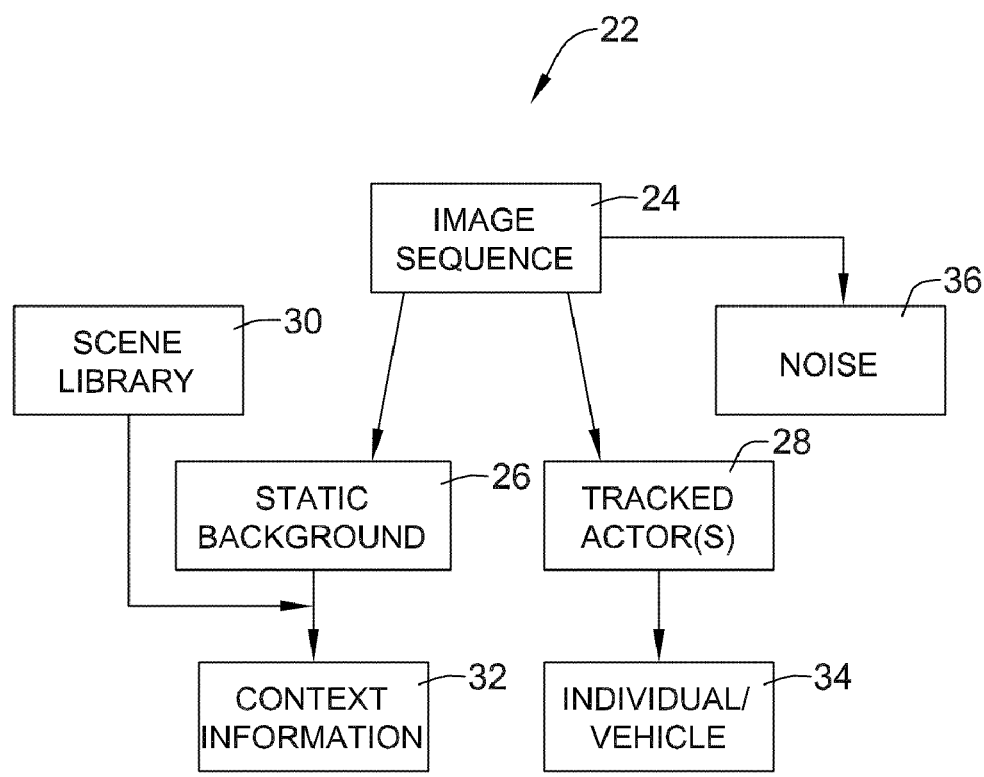
FIG. 2 is a flow chart showing an illustrative algorithm for extracting information from an image sequence.

In one illustrative algorithm 22 depicted in FIG. 2, for example, an image sequence represented generally by reference to block 24 can be analyzed by motion detection algorithms and/or motion tracking algorithms to differentiate between static background objects (block 26) and tracked actors (block 28). If, for example, the algorithm 22 determines that one or more objects located within the image sensor's FOV are stationary within each image sequence frame, the algorithm 22 can be configured to classify the object as a static object. Examples of static objects may include open spaces such as a parking lot, plaza, airport, museum, or objects typically located within such spaces such as furniture, equipment, plants, etc.

Once the algorithm 22 determines that an object is static background, the object can then be compared against a scene library 30 containing various scene information that can be used to classify the static object. The scene library 30 may contain prior video and/or still images of the environment, and/or may include a separate algorithm or routine that analyzes and classifies static objects located within the FOV of the image sensor. Once the algorithm 22 has detected and classified those objects within the FOV that are static, the algorithm 22 can then compile such information together to form context information of the scene, as indicated generally by reference to block 32. The context information can then be used in an actor feature database, as described in greater detail below with respect to FIG. 3. If, for example, such context information comprises a polygonal outline of a forbidden security zone, then one feature in the actor feature database may include a parameter relating to the distance between the actor and the security zone.

The algorithm 22 may further include a motion detection algorithm or routine that detects motion in the image frames. In certain embodiments, for example, the algorithm 22 can be configured to perform a background subtraction algorithm to detect the foreground (i.e. foreground pixels), and then subsequently perform blob analysis (i.e. group foreground pixels) to detect moving objects with the image frames. Other methods of detecting moving objects within the image frames are also possible, however.

In certain embodiments, the algorithm 22 can be further configured to determine the type of moving object detected, as indicated generally by reference to block 34. If, for example, the moving object is an individual or vehicle, the algorithm 22 can be configured to implement an object classification sub-routine that identifies whether the moving object is an individual, vehicle or other type of actor. Features such as the compactness or size of the moving object can be used in certain embodiments to differentiate between individuals or moving vehicles, if desired.

To increase the robustness of the motion detection algorithm, the algorithm 22 can include a noise detection subroutine 36 that can be used to filter out nominal movement of various scene elements, allowing the surveillance system 10 to differentiate between certain types of movement (i.e. application specific motion) detected within the FOV. If, for example, the image sequence 24 contains motion relating to inanimate objects such as moving drapes, swaying trees, passing clouds, etc., the noise detection subroutine 36 can be configured to filter out such elements from those elements classified as tracked actors at block 28.

Figure 3:
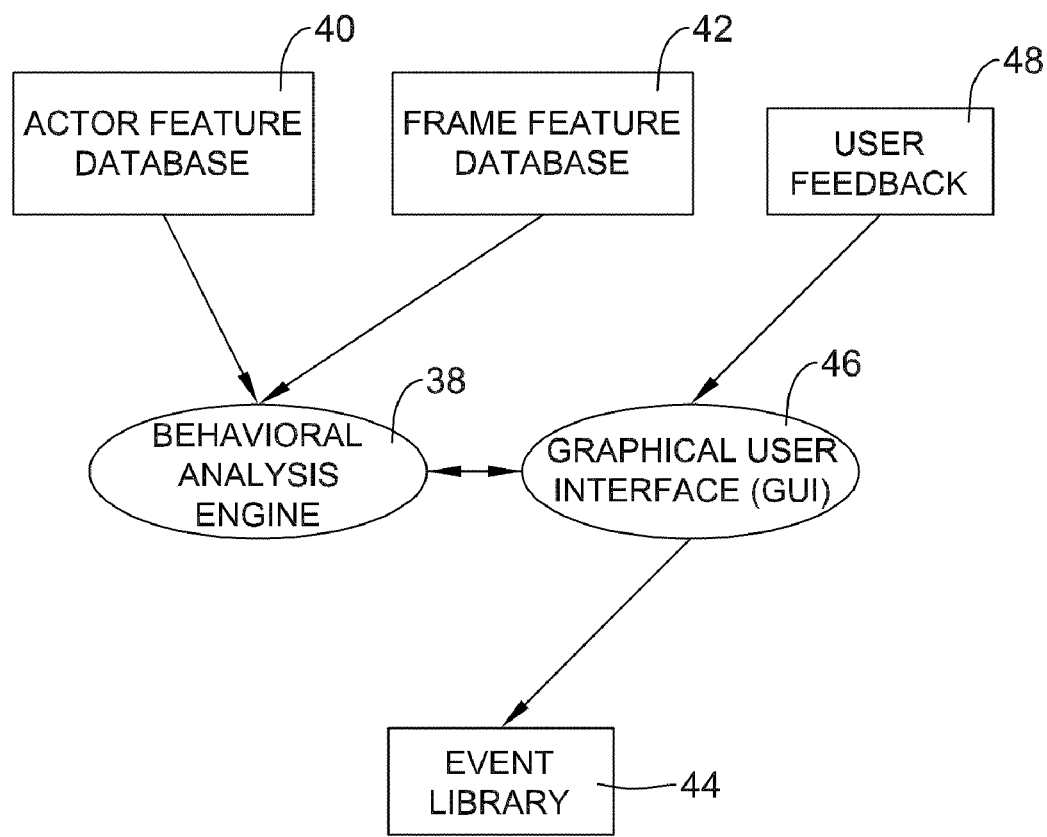
FIG. 3 is a block diagram showing an unsupervised behavioral analysis engine in accordance with an illustrative embodiment of the present invention.

FIG. 3 is a block diagram showing an unsupervised behavioral analysis engine 38 in accordance with an illustrative embodiment of the present invention. Engine 38, illustratively a software engine for use with a multi-sensor video surveillance system such as that depicted, for example, in FIG. 1, can be configured to run a number of algorithms or routines that can be used to automatically learn new events contained within an image sequence. The input to the behavioral analysis engine 38 can include the feature extraction steps described above, for example, with respect to the algorithm 22 of FIG. 2, forming an actor feature database 40 adapted to store features (i.e. feature vectors) relating to tracked actors disposed within an image sequence.

The behavioral analysis engine 38 may include a motion tracking algorithm or routine that can be configured to allocate a unique identifier to each tracked actor within the environment. Each time within the image sequence may be accorded a corresponding timestamp t within the actor feature database 40. For a single tracked object, the feature vector may be represented generally by the following string:

$$x_t = \{x_{1t}, x_{2t}, \ldots x_{nt}\}$$

where:

$x_t$=the feature vector for the tracked actor at time t, and n=the total number of features for the tracked actor.

The feature vector $x_t$, may include the features associated with the tracked actor as well as features relating to other actors and/or static background objects within the image sequence. In certain embodiments, for example, the feature vector $x_t$ may include information regarding the distance between the tracked actor and other actors detected by the surveillance system.

The types of features contained in the actor feature database 40 can be classified into different categories based on the spatial, motion, and temporal features of the tracked actor. Spatial features are generally defined as those features dependent on the spatial information in which the actor is tracked. Examples of such features may include, but are not limited to, the x and y coordinates of the tracked actor within space, the width and height of the bounding box used to track the actor, the pixel area of the tracked actor, and the compactness of the tracked actor. Furthermore, and as described previously with respect to FIG. 2, various context information such as the distance between the tracked actor and a defined security zone may also be used in defining some spatial features.

In certain embodiments, such spatial features can be determined using a process similar to that described above with respect to FIG. 2, wherein prior knowledge or scene information contained in a scene library can be used to determine the type of tracked actor disposed within the feature space. The actor feature database 40 may further contain information relating to the motion and temporal features of each tracked object including, for example, the speed and direction of each tracked actor as well as various trajectory information (e.g. staring position, ending position, path length and path distance, etc.) of each tracked actor.

In some embodiments, the actor feature database 40 may further contain one or more features relating to the relative position of important components of the actor. If, for example, the surveillance system is adapted detect the occurrence of a robbery, the actor feature database 40 may include a parameter relating to the position of the actor's arms (e.g. raised upright above the torso or relaxed), which in certain circumstances may indicate that a robbery has occurred.

As can be further seen in FIG. 3, the behavioral analysis engine 38 may also include a frame feature database 42 containing various characteristics of the tracked objects existing within each individual image frame. In certain embodiments, for example, the frame feature database 42 can include parameters relating to the number of objects detected in a particular frame and/or the total size of objects detected in a particular frame. If, for example, a building or room contains an unexpectedly high number of occupants, the behavioral analysis engine 38 can be configured to store a parameter within the frame feature database 42 that can be later used to trigger an alarm, adjust the climate within a room, or other such response. In the frame feature database 42, each frame at time t can be described by the following feature vector:

$$F_t = \{F_{1t}, F_{2t}, \ldots F_{nt}\}$$

where:

$F_t$=the feature vector associated with all tracked actors within the same frame and at a single camera at time t, and n=the total number of features within the frame.

While the illustrative actor feature database 40 and frame feature database 42 described with respect to the illustrative embodiment FIG. 3 are adapted for use with a single image sensor, it should be understood that such databases could be used in conjunction with a network of cameras, if desired. In such embodiments, a network feature database can be provided that describes the features contained in the entire camera network at time t.

The behavioral analysis engine 38 may further include an event library 44 that can be configured to store a list of all events that are trained. Each event encoded within the event library 44 may include a unique event number, an event name, an event description, and a listing of the image sequences representing the event. In certain embodiments, the event library 44 may further contain an event confidence level indicating the percentage likelihood that the image sequences containing the event are distinguishable over other events contained in the event library 44.

In certain embodiments, a graphical user interface 46 can be provided as a means to accept user feedback 48 for providing configuration information to the behavioral analysis engine 38 during training, and to alert the user of the existence of a particular event during testing or operation. The graphical user interface 46 can be implemented through either a software or hardware platform via an individual computer, a local area network (LAN), a wide area network (WAN), or other such structure.

Figure 4:
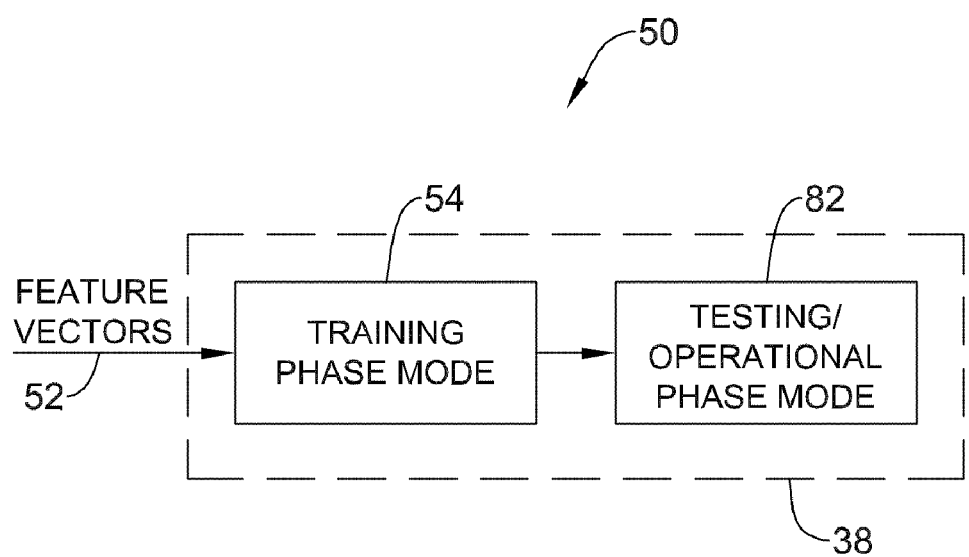
FIG. 4 is a diagram showing an illustrative method of unsupervised learning of events in a video sequence in accordance with an illustrative embodiment of the present invention.

Referring now to FIG. 4, an illustrative method 50 of unsupervised learning of events in a video sequence will now be described with respect to the behavioral analysis engine 38 of FIG. 3. As can be seen in FIG. 4, method 50 may begin with the input of a sequence of feature vectors 52 containing the spatial, motion, and temporal features of each tracked actor contained in an image sensor's FOV. The feature vector 52 may contain, for example, the speed, trajectory, width, height, aspect ratio, change in speed, change in size, etc. of one or more tracked actors. Once a sequence of feature vectors 52 is detected, the behavioral analysis engine 38 can be configured to initiate a training phase mode 54 in which the behavior analysis engine 38 automatically detects patterns in an image sequence to learn of possible events occurring within the image sensor's FOV.

Figure 5:
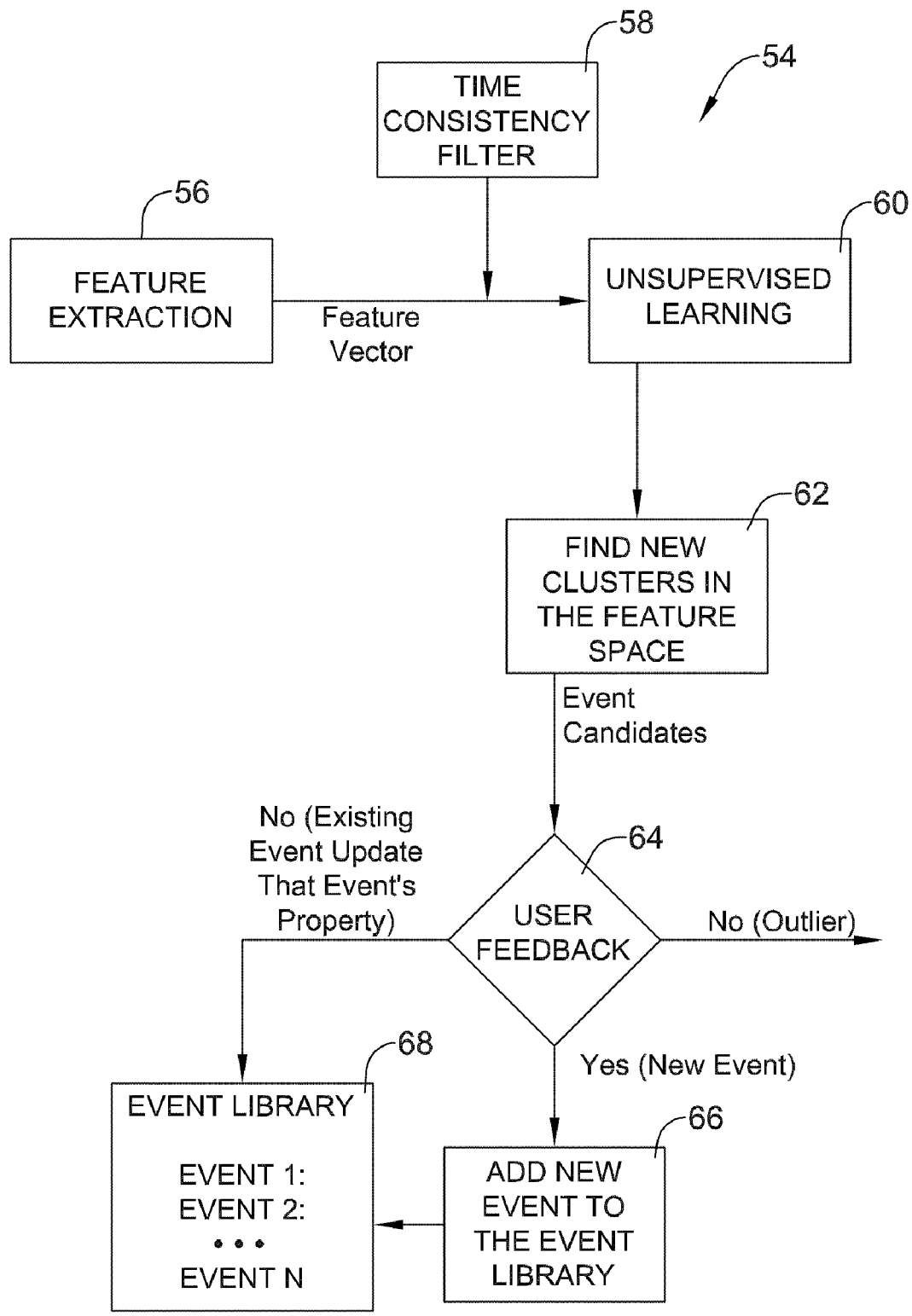
FIG. 5 is a flow chart showing the various steps of the training phase mode for the illustrative method of FIG. 4.

A detailed implementation of the training phase mode 54 of FIG. 4 can be seen, for example, in the illustrative flow chart of FIG. 5. As can be seen in FIG. 5, once extracted features (block 56) are obtained from the feature vector 52, the feature vector 52 may be passed through a time consistency filter (block 58), which groups image frames together into a meaningful sequence for further processing. Subsequently, the behavioral analysis engine 38 can then be configured to perform unsupervised learning (block 60) to produce a list of possible event candidates. The feature vector 52 can then be expressed in multiple-dimensions, including but not limited to three-dimensional space. In some embodiments, event detection can occur in multi-dimensional feature space with each event defining a point cloud (i.e. a cluster of points, a hyper-ellipse, etc.) in the feature space with different events being described by different point clouds. Unsupervised learning of the feature vector 52 can occur without the aid of pre-defined events by employing a clustering routine that detects groups of point clouds contained within the feature space. Examples of suitable clustering routines may include hierarchical clustering (e.g. agglomerative or divisive), K-means clustering, K-medoids clustering, and/or Self Organizing Map clustering.

If a new cluster in the feature space is detected at block 62, the behavior analysis engine 38 can be configured to request user feedback (block 64) to confirm whether the new cluster represents a new event (e.g. an individual falling down). If at decision block 64, the user decides to accept the event candidate, the behavior analysis engine 38 can be configured to add the new event to the event library, as indicated generally by reference to blocks 66 and 68. Alternatively, if the user views the image sequences associated with the event candidate and believes that the event candidate is already an existing event in the event library, the user may prompt the behavior analysis engine 38 to update the existing event's properties in the event library with the new image sequence. If, in the alternative, the user believes that the event candidate is an outlier, the user may prompt the behavioral analysis engine 38 to discard the candidate.

Figure 6:
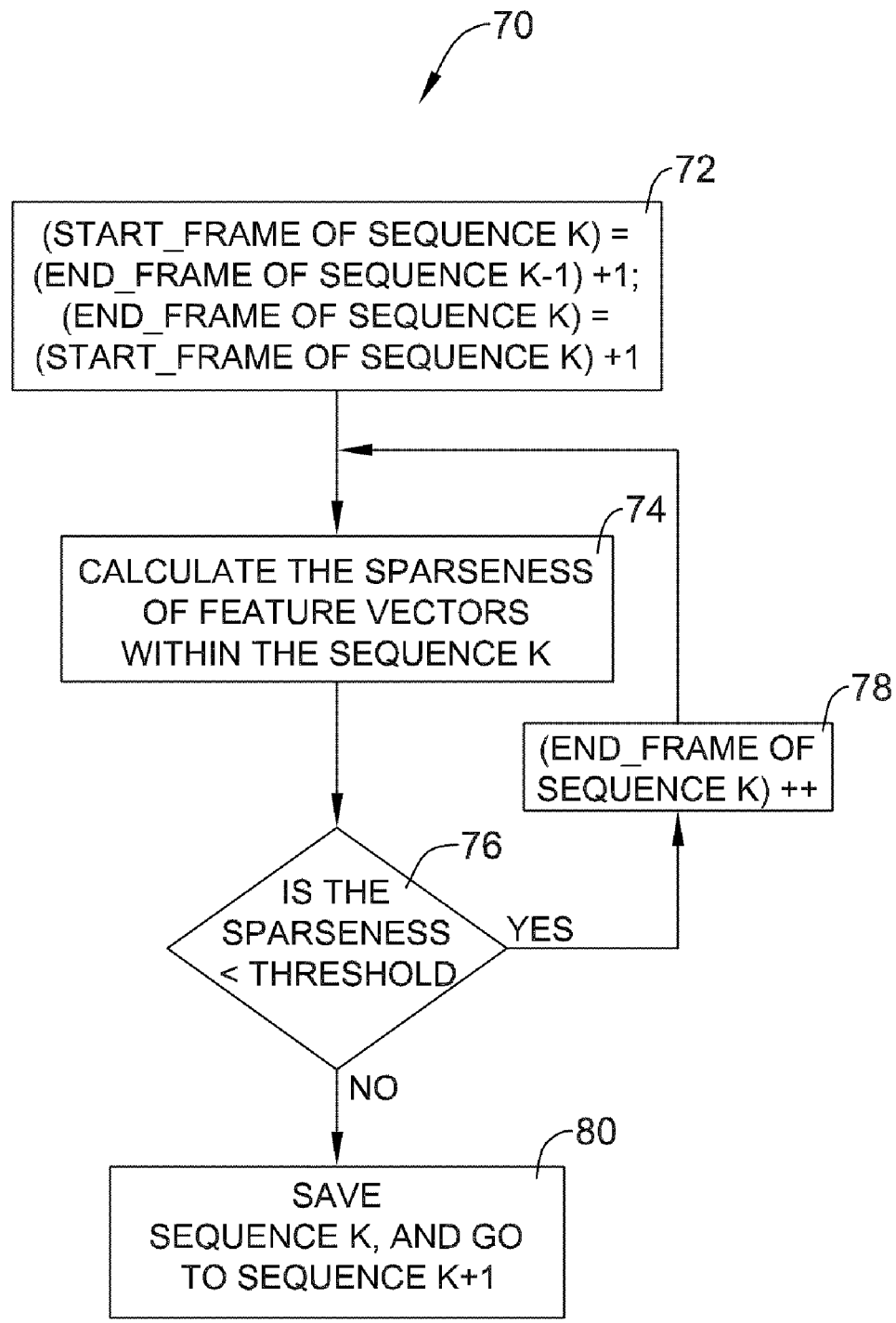
FIG. 6 is a flow chart showing an illustrative time-consistency filter routine used in the formation of a time-consistent image sequence.

To group image frames together into a meaningful sequence for processing during the unsupervised learning step 60 of the training phase mode 54, the behavioral analysis engine 38 can be configured to employ a time-consistency filter routine that traverses the image sequence frame by frame and groups together those frames that are time consistent. In one such illustrative filter routine 70 depicted in FIG. 6, for example, the behavioral analysis engine 38 can begin at block 72 by defining an initial start-frame parameter of the image sequence and an end-frame parameter of the image sequence. Once the start and end-frame parameters are initially defined at block 72, the behavioral analysis engine 38 next calculates a sparseness value (block 74) within the current image sequence representing a measure of the inconsistency of frames within the image sequence. In certain embodiments, for example, a measure of the sparseness of the current image sequence can be determined in accordance with the following generalized formula:

$$\text{sparseness} = \frac{1}{(Endframe - Startframe)} \sum_{i=Startframe}^{Endframe} (x_i - \bar{x})^2$$

where:

$x_i$=the feature vector of the current image sequence, and $\bar{x}$=the mean of all feature vectors within the image sequence.

Once the sparseness is determined from the current image sequence, the behavioral analysis engine 38 next compares this value to a specified threshold, as shown generally by reference to decision block 76. If, for example, the sparseness of the image sequence is less than the specified threshold, the behavioral analysis engine 38 can be configured to step up the end-frame parameter (block 78) and then recalculate the sparseness of the newly configured image sequence one or more times until the sparseness threshold is met. If the sparseness is greater or equal to the specified threshold value, the behavioral analysis engine 38 can then be configured to save the current image sequence and then proceed to the next image sequence within the video clip until all image sequences have been filtered, as shown, for example, by reference to block 80.

Figure 7:
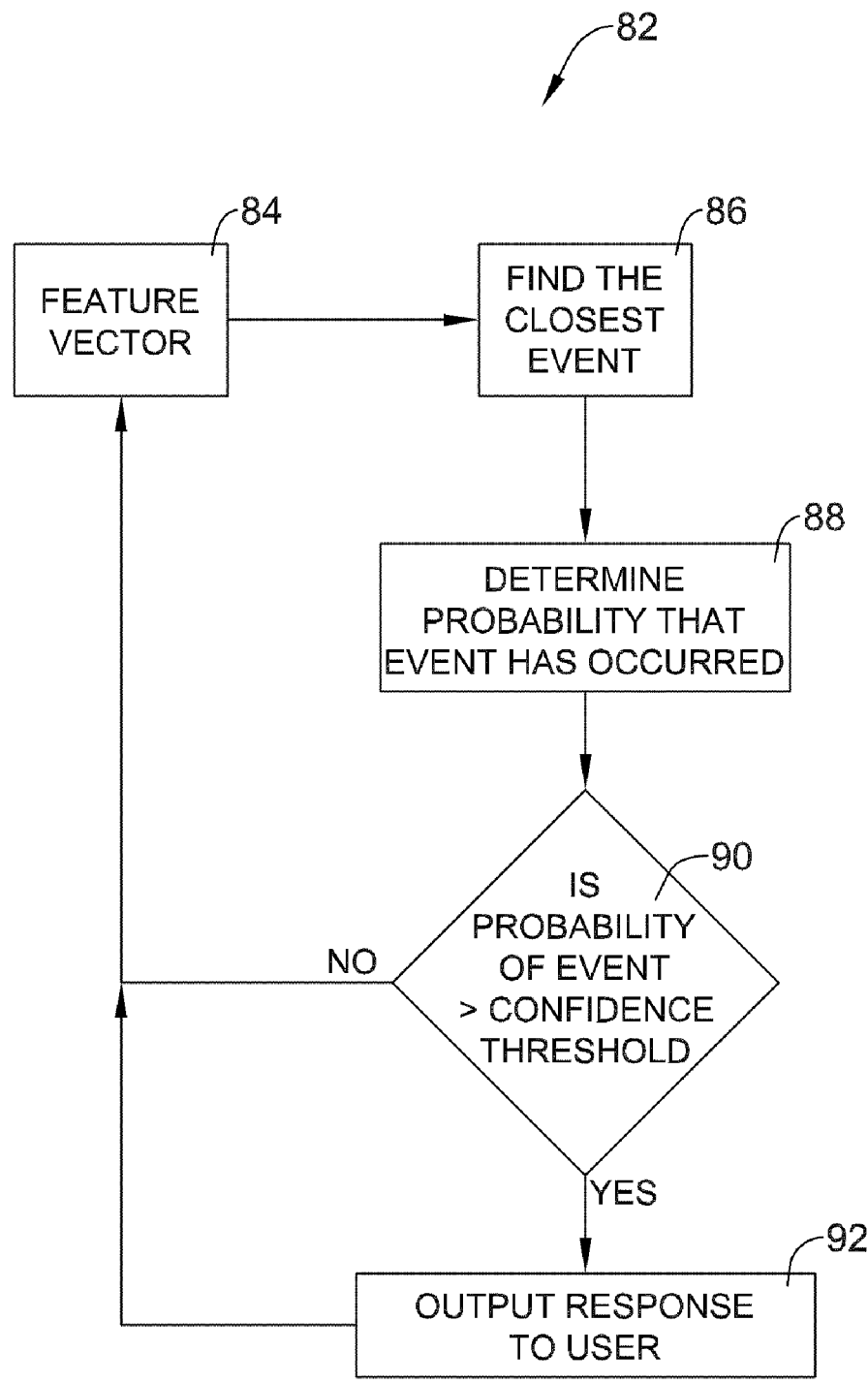
FIG. 7 is a flow chart showing various steps of the testing/operational phase mode for the illustrative method of FIG. 4.

Referring back to FIG. 4, once the user has completed the training phase mode 52, the behavioral analysis engine 38 can be configured to initiate a testing/operational phase mode 82. As shown in greater detail in FIG. 7, the testing/operational phase mode 82 may begin with the step of obtaining a feature vector (block 84) containing feature properties corresponding to one or more objects contained within an image sequence. Once a feature vector is received, the behavioral analysis engine 38 can then be configured to compare the feature vector of each tracked object against those events configured within the event library 44 to find the closest event, as indicated generally by reference to block 86.

Once a possible event candidate has been found, the behavioral analysis engine 38 can then be configured to determine the probability that the event has occurred, as indicated generally by reference to block 88. During this step, the behavioral analysis engine 38 can attempt to both increase the probability that the event detected is accurate and decrease the probability that the event is an exclusive event (i.e. an event in which the actor can only satisfy one but not all events). If, for example, the behavioral analysis engine 38 detects that an individual has fallen down, the behavioral analysis engine 38 can be configured to concomitantly reduce the probability of that individual satisfying a "standing upright" event programmed within the event library 44.

As show further by reference to blocks 90 and 92, if the behavioral analysis engine 38 determines that the probability that an event has occurred is greater than a pre-determined confidence threshold value, the behavioral analysis engine 38 can be configured to output an alarm or other such response informing the user that an event has occurred.

In addition to or in lieu of detecting events occurring in real-time, the surveillance system can be configured to perform video retrieval based on one or more encoded events. If, for example, the user wishes to retrieve all image sequences containing a "falling down" event within the past 48 hours, the behavioral analysis engine 38 can be configured to scan the event library 44 to search for such events. The image sequence or sequences relating to such event can then be provided to the user via a graphical user interface, if desired.

Turning now to FIGS. 8-12, a method of unsupervised learning of events within a video sequence will now be described in the context of an illustrative graphical user interface 94. The graphical user interface 94 may include a display screen 96 configured to display various information related to the status and operation of the behavioral analysis engine 38 as well as other components of the surveillance system. In the illustrative view depicted in FIG. 8, for example, the graphical user interface 94 may include a VIDEO PLAYBACK section 98 having a number of playback controls 100 that permit the user to rewind, play, pause, and fast-forward video clips stored by the behavior analysis engine 38. If desired, a menu bar 102 located on the top section of the graphical user interface 94 may be provided to permit access to other playback and/or recording features (e.g. slow-motion playback, continuous-loop playback, etc.), as desired.

An EVENT SEQUENCES section 104 of the graphical user interface 94 may display one or more image sequences each corresponding to a particular event sequence configured within the behavioral analysis engine 38. If, for example, the behavioral analysis engine 38 includes an encoded event for detecting whether an individual is walking slow or walking fast, the display screen 96 can be configured to display the two events as separate event tiles 106,108 (i.e. snapshots) in the EVENT SEQUENCES section 104. If the user desires to display those frames contained within any of the displayed event tiles 106,108, the user can select (e.g. single click) the desired event tile 106,108 with a mouse, joystick, keyboard, of other such peripheral device, causing the graphical user interface 94 to display the individual frames forming the event sequence within a FRAMES WITHIN A SEQUENCE section 110. In some embodiments, the user can also select (e.g. double click) the desired event tile 106,108 to display the video clip supporting the event sequence within the VIDEO PLAYBACK section 98, if desired.

A 3D FEATURE SPACE section 112 of the graphical user interface 94 can be used to display a representation of cluster points within the image sensor's FOV. An event candidate text box 114 located below the 3D FEATURE SPACE section 112 can be used to display whether the behavioral analysis engine 38 has detected a potential event candidate through unsupervised learning, as described herein. Although a 3D FEATURE SPACE section 112 is specifically depicted in the illustrative embodiment, it should be understood that the feature space is a super space of features, and therefore can be displayed in more or less than three dimensions, as desired. In certain embodiments, the graphical user interface 94 may include an icon button and/or pull-down menu that permits the user to vary the manner in which the feature vector is represented and/or to select those features the user desires to view on the display screen 96.

Figure 8:
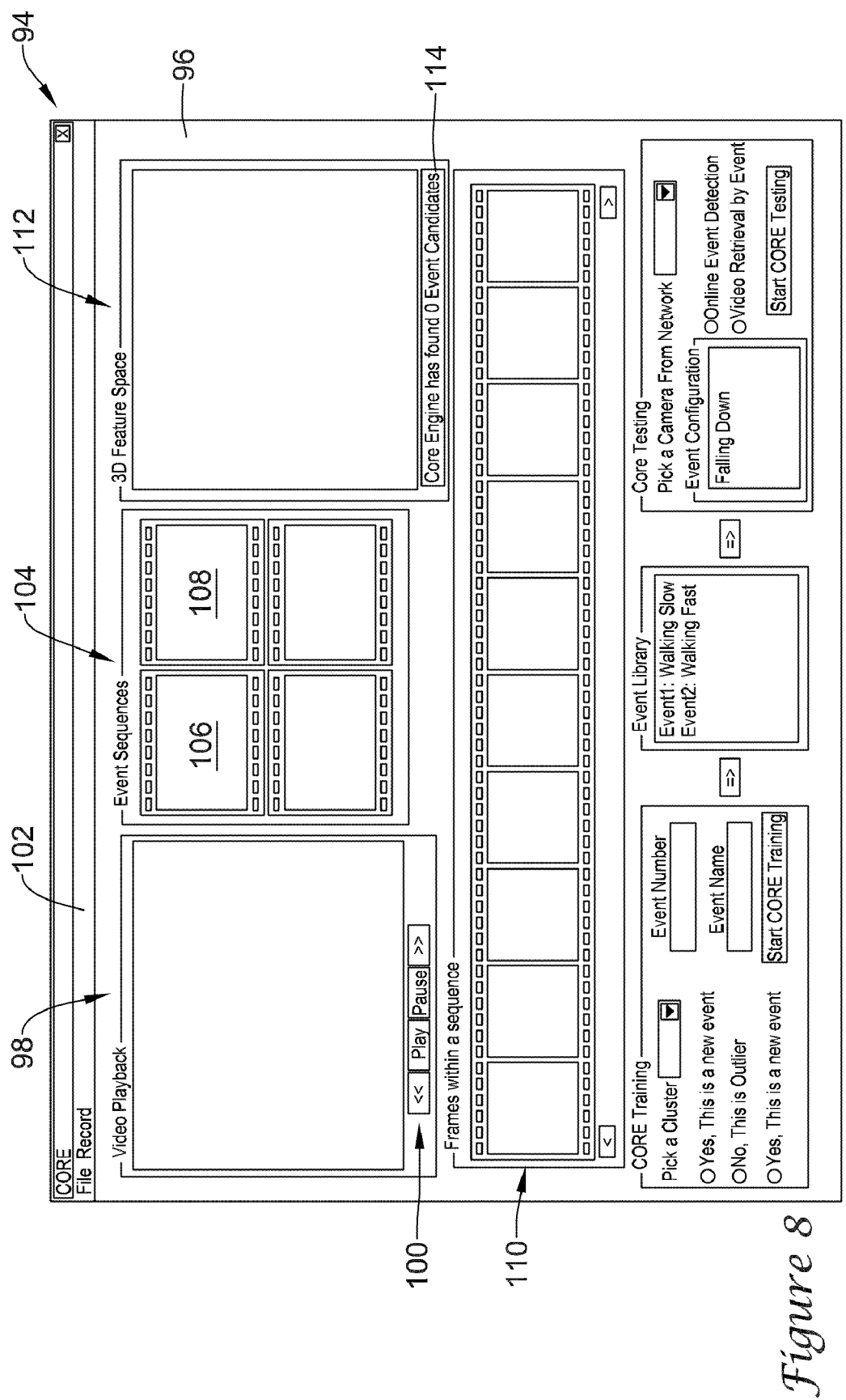
FIG. 8 is a pictorial view showing an illustrative graphical user interface for use with the behavioral analysis engine of FIG. 3.
Figure 9:
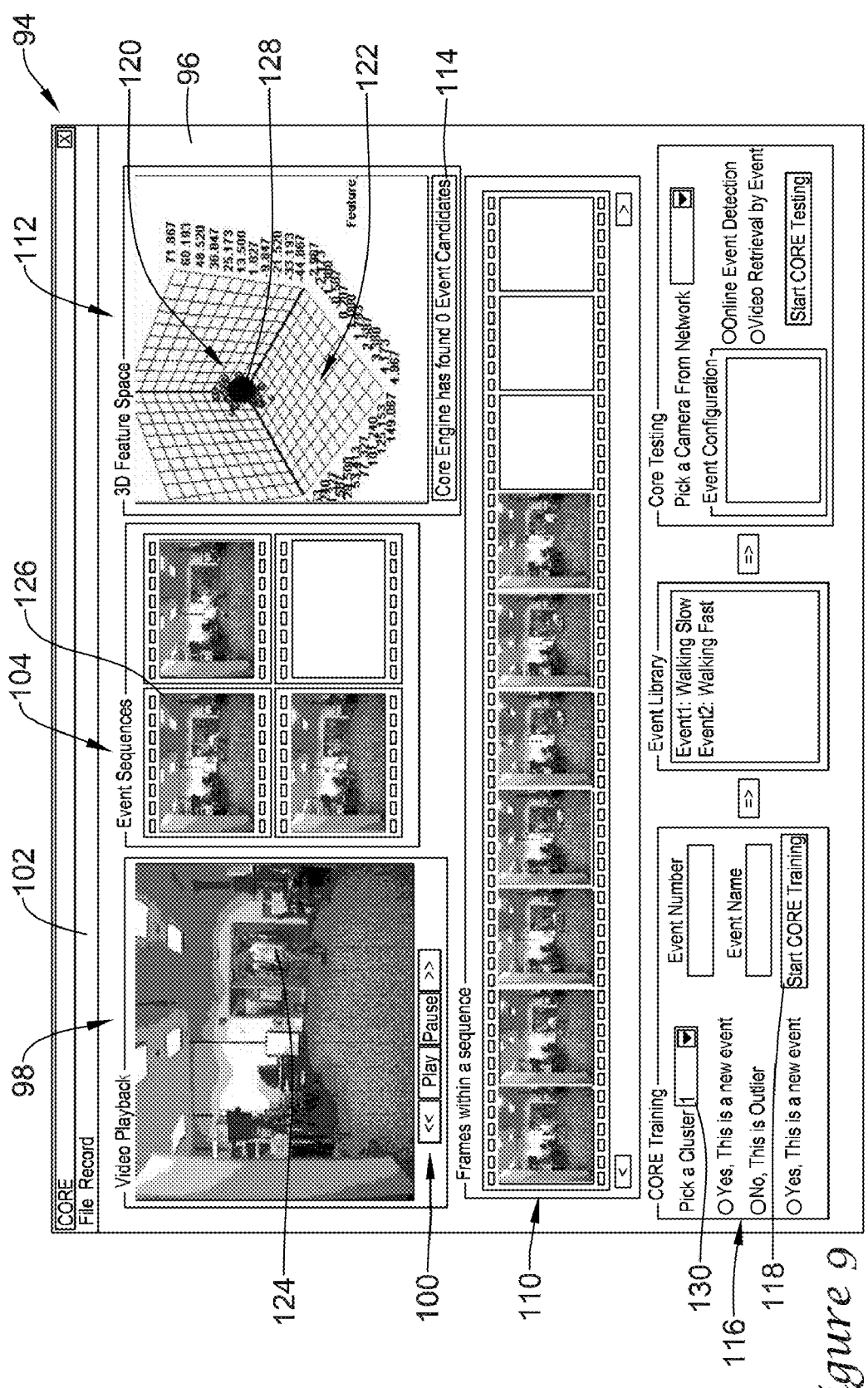
FIG. 9 is a pictorial view showing an illustrative step of configuring the training phase mode of the behavioral analysis engine using the graphical user interface of FIG. 8.

FIG. 9 is a pictorial view showing an illustrative step of configuring the training phase mode 54 of the behavioral analysis engine 38 using the graphical user interface 94 of FIG. 8. As can be seen in FIG. 9, the graphical user interface 94 may include a TRAINING section 116 that can be utilized by the user to decide whether an event candidate should be stored within the event library 44.

A start icon button 118 can be selected by the user to initiate the training phase mode 54 within the behavioral analysis engine 38, causing the graphical user interface 94 to display a 3D representation of the feature space in the 3D FEATURE SPACE section 112. In the illustrative view depicted in FIG. 9, for example, a single cluster 120 of points (i.e. a point cloud) representing a feature vector of an actor within three dimensional space may be displayed on the display screen 96 along with a 3D graph 122 showing the general dimensions of the feature scene within the image sensor's FOV. While a three-dimensional feature space is specifically depicted in the illustrative view of FIG. 9, it should be understood that the feature space could be represented in other dimensions (e.g. 2D, 4D, etc.), if desired.

As can be further seen in FIG. 9, the video clip and event sequences containing the images used in detecting the event candidate can be displayed, respectively, in the VIDEO PLAYBACK and EVENT SEQUENCES section 98,104 of the graphical user interface 94 along with a alphanumeric message within the text box 114 indicating that the behavioral analysis engine 38 has detected an event candidate. In the illustrative view depicted in FIG. 9, for example, a video clip showing an individual 124 falling down within the FOV of the image sensor is displayed in the VIDEO PLAYBACK section 98. An event tile 126 containing the image sequences within the video clip used in detecting the event candidate can also be displayed in the EVENT SEQUENCES section 104. If, desired, the user may further select an event tile 126 to display the individual frames contained within that event sequence in the FRAMES WITHIN A SEQUENCE section 110 of the graphical user interface 94.

To select a particular cluster within the 3D FEATURE SPACE section 112, the user may move a selection pointer 128 over the cluster 120 displayed on the display screen 96. The user may then select a cluster number 130 to be assigned to the selected cluster 120 via the TRAINING section 116. As shown in FIG. 9, for example, the user may assign a cluster number 130 of "1" corresponding to the single cluster 120 of points displayed in the 3D FEATURE SPACE section 112. If multiple clusters exist on the screen, the user may assign a separate cluster number 130 for each selected cluster, allowing the user to configure multiple events from the video clip.

Figure 10:
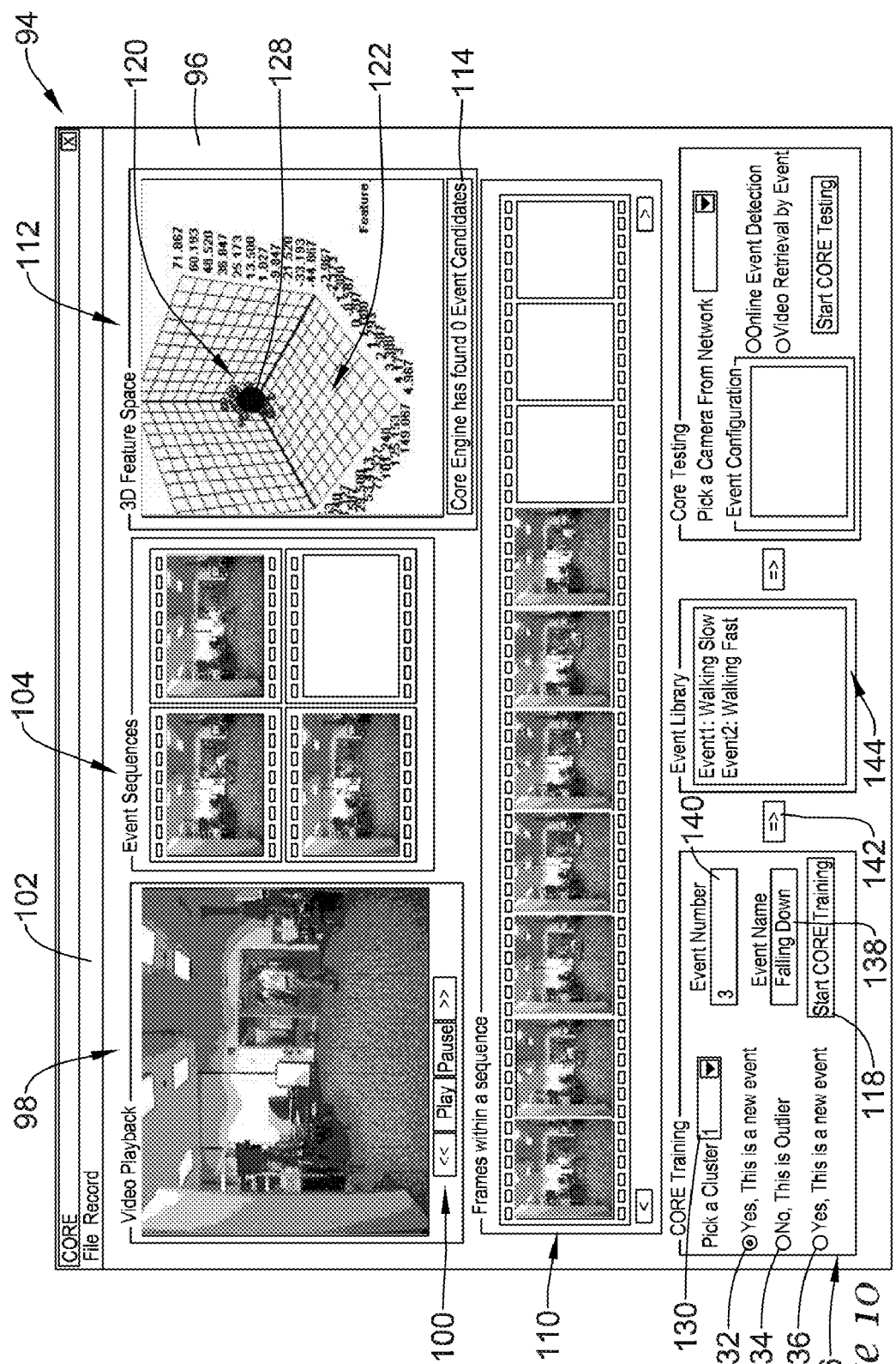
FIG. 10 is a pictorial view showing an illustrative step of confirming an event candidate using the graphical user interface of FIG. 8.
Figure 11:
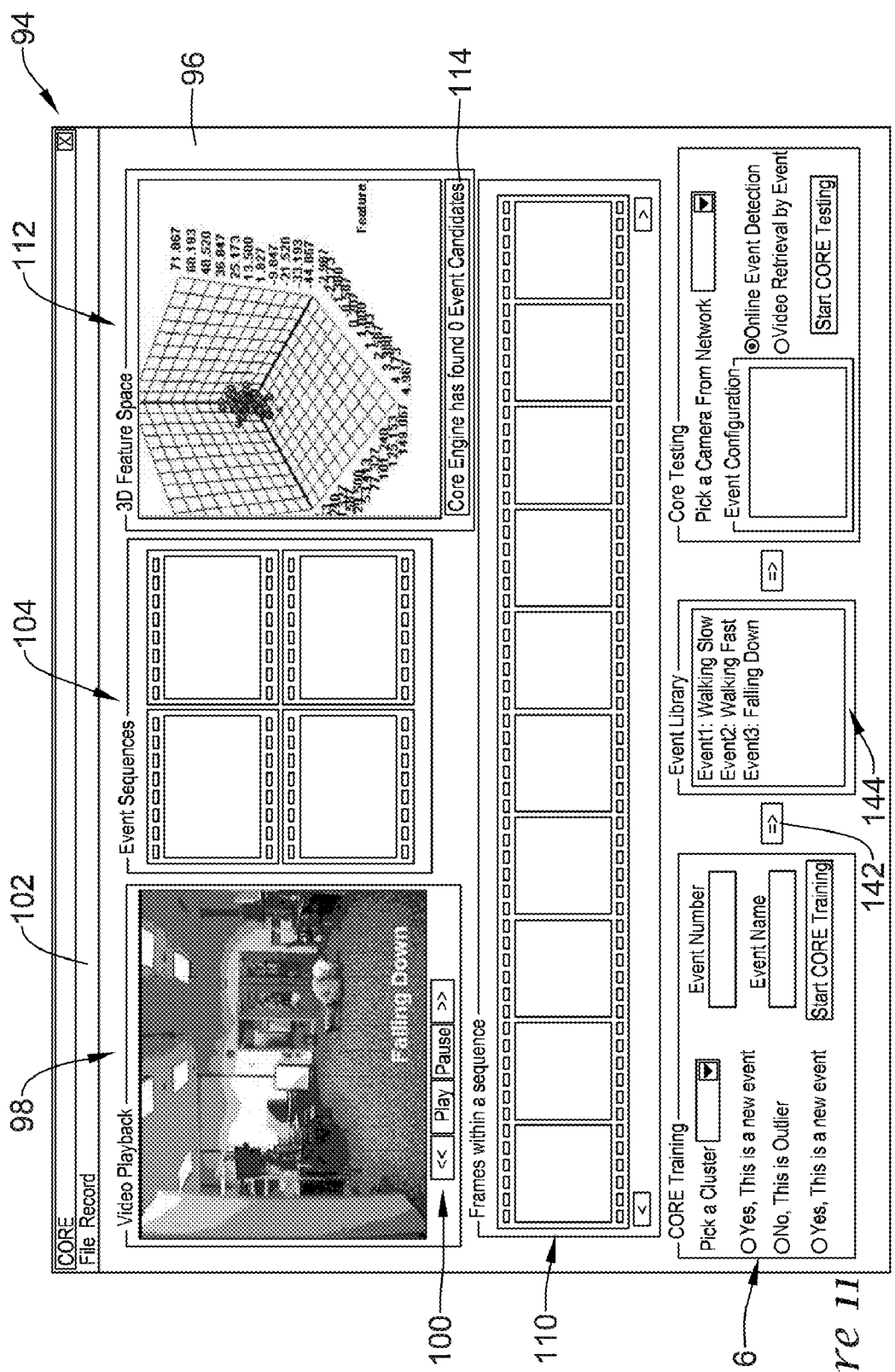
FIG. 11 is a pictorial view showing the display screen for the graphical user interface of FIG. 10 subsequent to confirming an event candidate and updating the event library.

FIG. 10 is a pictorial view showing an illustrative step of confirming an event candidate once a cluster has been selected. As shown in FIG. 10, once the user has selected at least one cluster within the 3D FEATURE SPACE section 112 (e.g. cluster 120), the graphical user interface 94 may prompt the user to confirm whether the event candidate is a new event, is an outlier, or is an existing event. If, for example, the user wishes to confirm that cluster 120 is a new event, the user may select icon button 132 on the display screen 96. Alternatively, if the user desires to reject the event candidate as an outlier, or as an existing event already contained within the event library 44, the user may select the appropriate one of the icon buttons 134,136 on the display screen 96.

If the user confirms that an event candidate is a new event, an event number and event name may then be assigned to the event, allowing the user to distinguish between other events contained within the event library 44. As shown in FIG. 10, for example, if the user desires to add a new event entitled "Falling Down" to the event library 44, the user may type in the text "Falling Down" within a text box 138 located on the display screen 96. The event number to be assigned to the new event may also be entered into a number box 140, if desired. If, for example, the event library 44 currently contains two previously configured events, the graphical user interface 94 may prompt the user to enter a "3" into the number box 140, assigning an event number of 3 to the new event.

To store the new event into the event library 44, the user may select an update icon button 142 on the display screen 96, causing the new event to be displayed in an EVENT LIBRARY section 144 representing all available events stored within the event library 44. As shown in a subsequent step in FIG. 11, once the user selects the update icon button 142, the number and title of the new event (i.e. "Event 3: Falling Down") can be displayed in the EVENT LIBRARY section 144 along with the other events configured within the event library 44. In certain embodiments, the event sequences and image frames displayed in the EVENT SEQUENCES and FRAMES WITHIN A SEQUENCE sections 104,110 as well as the data displayed on the TRAINING section 116 of the graphical user interface 94 may disappear, indicating to the user that the event has been successfully programmed into the event library 44.

Figure 12:
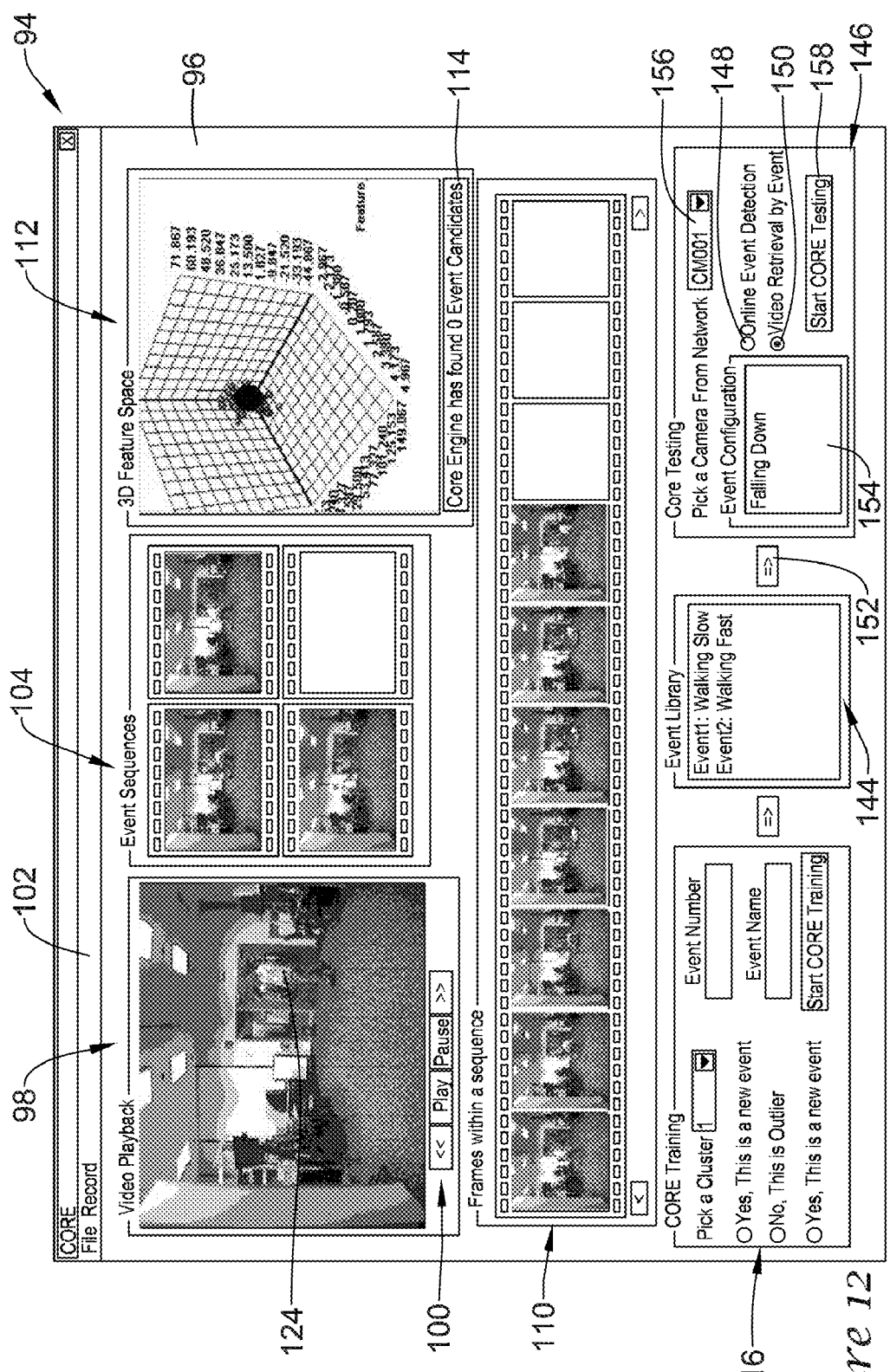
FIG. 12 is a pictorial view showing an illustrative step of configuring the testing/operational phase mode of the behavioral analysis engine using the graphical user interface of FIG. 8.

FIG. 12 is a pictorial view showing an illustrative step of configuring the testing/operational phase mode 82 of the behavioral analysis engine 38 using the graphical user interface 94 of FIG. 8. As shown in FIG. 12, the graphical user interface 94 may further include a TESTING section 146 that can be used in the testing/operational phase mode 82 of the behavioral analysis engine 38. In certain embodiments, the TESTING section 146 may include a set of icon buttons 148,150 that permit the user to select between an "Online Event Detection" mode that applies all events displayed in the EVENT LIBRARY section 144 to each video camera within the surveillance system, or a "Video Retrieval By Event" mode that tasks different video cameras to detect different events contained in the event library 44.

To initiate the testing/operational phase mode 82 of the behavioral analysis engine 38 using the "Video Retrieval By Event" mode, for example, the user may select a desired event (e.g. "Event3: Falling Down") in the EVENT LIBRARY section 144 and then select update icon button 152 on the display screen 96, causing that event to be displayed in a text box 154 located in the TESTING section 146. At or about this time, the user may also select icon button 150 on the display screen 96, causing the behavioral analysis engine 38 to display the camera or cameras within the surveillance system to be tasked in detecting the selected event. If, for example, the user desires the behavioral analysis engine 38 to detect a "Falling Down" event using "camera 1" of the surveillance system, the user may select "CM001" in a text box 156 provided on the display screen 96.

Once the user has configured the surveillance system to operate in the "Video Retrieval By Event" mode, the user may then select icon button 158 in the TESTING section 146, causing the behavioral analysis engine 38 to retrieve all video images corresponding to the configured event. In the illustrative view depicted in FIG. 12, for example, the behavioral analysis engine 38 can be configured recall all event sequences stored within the event library 44 in which a "falling down" event is detected by camera 1. The video clip and event sequences corresponding to the event can then be displayed in the VIDEO PLAYBACK and EVENT SEQUENCES sections 98,104 of the display screen 96, if desired.

If, in the alternative, the user desires to initiate the testing/operational phase mode 82 of the behavioral analysis engine 38 using the "Online Event Detection" mode, the user may select icon button 148 in the TESTING section 146 and then initiate the testing process by selecting icon button 158 on the display screen 96. When selected, the behavioral analysis engine 38 can be configured to apply all events contained in the event library 44 to each camera within the network, causing the behavioral analysis engine 38 to display any detected event on the display screen 96. If, for example, the behavioral analysis engine 38 detects that a tracked individual has fallen down, such event can be displayed as a video clip in the VIDEO PLAYBACK section 98. In certain embodiments, a log file may also be created that records the detected event within the FOV of the image sensor along with a timestamp. If desired, a text message containing the name of the detected event can also be displayed on the display screen 96, informing the user that the particular event has been detected.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A method of learning events contained within a video image sequence, the method comprising:
   providing a computing system that is configured to receive the image sequence, the computing system programmed to:
   provide a behavioral analysis engine that is configured to learn new events contained within the image sequence;
   initiate a training phase mode within the behavioral analysis engine and obtain a feature vector including one or more parameters relating to an object disposed within the image sequence;
   identify one or more clusters for at least some of the one or more parameters, at least some of the one or more clusters corresponding to possible event candidates;
   display an identifier for at least some of the possible event candidates on a display; and
   allow a user to select one or more of the possible event candidates, and to include the selected one or more of the possible event candidates into an event library.

2. The method of claim 1, wherein the behavioral analysis engine of the computing system includes and/or accesses an actor feature database and/or a frame feature database.

3. The method of claim 1, wherein the one or more clusters are within a feature space of the image sequence.

4. The method of claim 1, wherein the feature vector is a multi-dimensional vector.

5. The method of claim 4, wherein said multi-dimensional vector is a three-dimensional vector.

6. The method of claim 1, wherein the feature vector includes a number of spatial parameters.

7. The method of claim 1, wherein the feature vector includes a number of motion parameters.

8. The method of claim 1, wherein the feature vector includes a number of temporal parameters.

9. The method of claim 1, wherein the computing system is further programmed to prompt a user to confirm that a selected possible event candidate is a new event before including the selected possible event candidate into the event library.

10. The method of claim 9, wherein the said step of prompting is accomplished using a graphical user interface on the display.

11. The method of claim 9, wherein the computing system is further programmed to store the selected possible event candidate within the event library.

12. The method of claim 9, wherein said step of prompting a user to confirm that a selected possible event candidate is performed by the user.

13. The method of claim 1, further including the step of applying a time-consistency filtering routine to the image sequence prior to said identifying step.

14. The method of claim 1, wherein said identifying step is performed automatically by the behavioral analysis engine of the computing system.

15. The method of claim 1, wherein said identifying step is performed using an unsupervised learning algorithm.

16. The method of claim 15, wherein said unsupervised learning algorithm includes a clustering routine.

17. The method of claim 1, further including the step of initiating a testing phase mode within the behavioral analysis engine of the computing system, said testing phase mode is configured to detect the occurrence of one or more learned events.

18. The method of claim 17, wherein, during the testing phase mode of the behavioral analysis engine, the computing device is programmed to:
   compare features contained within the feature vector against one or more learned events;
   determine the probability that an event has occurred; and
   output a response to the user if the probability that the event has occurred is greater than a confidence threshold value.

19. The method of claim 1, wherein said behavioral analysis engine is a software engine running on the computing system.

20. A method of learning events contained within a video image sequence, the method comprising:
   providing a computing system that is configured to receive the image sequence, the computing system programmed to:
   provide a behavioral analysis engine that is configured to learn new events contained within the image sequence, the behavioral analysis engine including an actor feature database, a frame feature database, and a programmable event library stored in a memory;
   initiate a training phase mode within the behavioral analysis engine and obtaining a feature vector including one or more parameters relating to an object disposed within the image sequence;
   analyze the feature vector to determine a number of possible event candidates;
   prompt a user to confirm whether a detected event candidate is a newly identified event; and
   store the new event within the event library if the detected event candidate is confirmed by the user.

21. The method of claim 20, wherein the feature vector includes a cluster of points disposed within a feature space of the image sequence.

22. The method of claim 20, wherein the feature vector is a multi-dimensional vector.

23. The method of claim 22, wherein said multi-dimensional vector is a three-dimensional vector.

24. The method of claim 20, wherein the feature vector includes a number of spatial parameters.

25. The method of claim 20, wherein the feature vector includes a number of motion parameters.

26. The method of claim 20, wherein the feature vector includes a number of temporal parameters.

27. The method of claim 20, wherein the computing system is programmed to prompt a user to confirm whether a detected event candidate is a newly identified event via a graphical user interface on a display.

28. The method of claim 20, wherein the computing system is further programmed to store an event within the event library subsequent to the step of confirming that a detected event candidate is a newly identified event.

29. The method of claim 20, wherein the computing system is further programmed to apply a time-consistency filtering routine to the image seguence prior to said step of analyzing the feature vector to determine a number of possible event candidates.

30. The method of claim 20, wherein said step of analyzing the feature vector to determine a number of possible event candidates is performed automatically by the behavioral analysis engine.

31. The method of claim 20, wherein said step of analyzing the feature vector to determine a number of possible event candidates is performed using an unsupervised learning algorithm.

32. The method of claim 31, wherein said unsupervised learning algorithm includes a clustering routine.

33. The method of claim 20, wherein the computing system is further programmed to initiate a testing phase mode within the behavioral analysis engine, said testing phase mode configured to detect the occurrence of one or more learned events.

34. The method of claim 33, wherein, during the training phase mode of the behavioral analysis engine, the computing system is programmed to:
   compare features contained within the feature vector against one or more learned events;
   determine the probability that an event has occurred; and
   output a response to the user if the probability that the event has occurred is greater than a confidence threshold value.

35. The method of claim 20, wherein said behavioral analysis engine is a software engine running on the computing system.

36. A method of learning events contained within a video image sequence, the method comprising:
   providing a computing system that is configured to receive the image sequence, the computing system programmed to:
   provide a behavioral analysis engine that is configured to learn new events contained within the image sequence;
   allow a user to initiate a training phase mode within the behavioral analysis engine and obtaining a feature vector including one or more parameters relating to an object disposed within the image sequence;
   apply a time-consistency filtering routine to the image sequence;
   analyze the feature vector to determine a number of possible event candidates;

prompt a user to confirm whether a detected event candidate is a newly identified event; and store the newly identified event within an event library if the detected event candidate is confirmed by the user.

37. A method of learning events contained within a video image sequence, the method comprising:

providing a computing system that is configured to receive the image sequence, the computing system programmed to:

provide a behavioral analysis engine that is configured to learn new events contained within the image sequence;

initiate a testing phase mode within the behavioral analysis engine;

detect the occurrence of one or more possible event candidates;

receive confirmation from a user whether a detected event candidate is a newly identified event; and store the newly identified event within an event library if the detected event candidate is confirmed by the user.

38. The method of claim 37, wherein said step of detecting the occurrence of one or more possible event candidates is performed in real-time.

39. The method of claim 37, wherein said step of detecting the occurrence of one or more possible event candidates is performed using previously recorded video.

40. A method of learning events contained within a video image sequence, the method comprising the steps of:

providing a computing system that is configured to receive the image sequence, the computing system programmed to:

provide a behavioral analysis engine that is configured to learn new events contained within the image sequence;

detect the occurrence of one or more events learned by the behavioral analysis engine;

determine the probability that an event has occurred; and output a response to a user if the probability that the event has occurred is greater than a confidence threshold value.

* * * * *

UNITED STATES PATENT AND TRADEMARK OFFICE
CERTIFICATE OF CORRECTION

PATENT NO. : 7,606,425 B2 Page 1 of 1
APPLICATION NO. : 10/938244
DATED : October 20, 2009
INVENTOR(S) : Bazakos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1166 days.

Signed and Sealed this

Twelfth Day of October, 2010

David J. Kappos
*Director of the United States Patent and Trademark Office*